Oct. 3, 1933.  W. J. CRAWFORD  1,929,198
CONTROL VALVE FOR HEATING SYSTEMS
Filed April 23, 1932
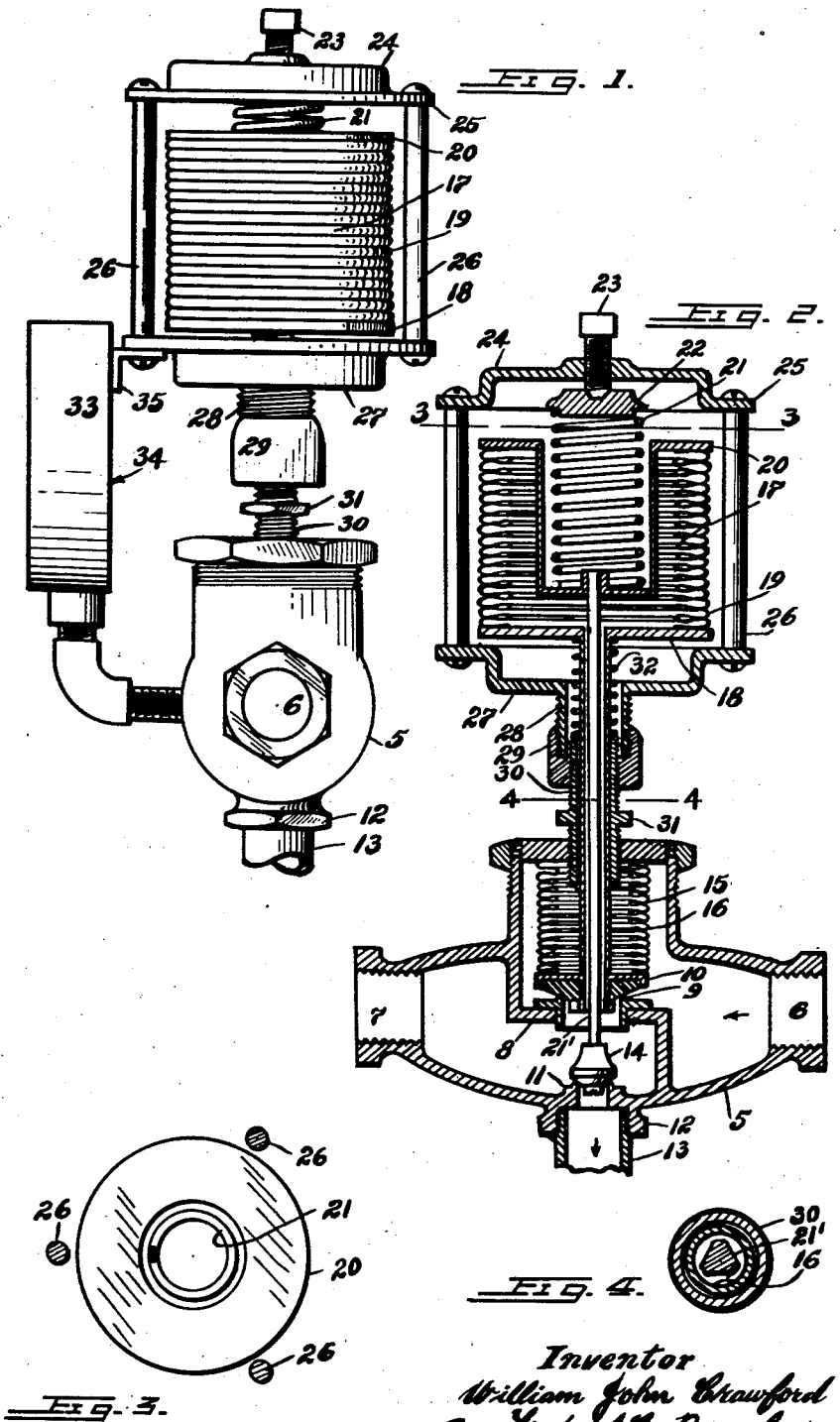
Inventor
William John Crawford
By Frederick E. Bromley
Attorney.

Patented Oct. 3, 1933

1,929,198

UNITED STATES PATENT OFFICE 1,929,198

CONTROL VALVE FOR HEATING SYSTEMS

William John Crawford, Niagara Falls, Ontario, Canada

Application April 23, 1932. Serial No. 607,077

10 Claims. (Cl. 137—153)

The object of the present invention is to produce a valve for automatically controlling the water in a hot water heating system. The valve is designed to automatically replenish water as it is required and also to relieve pressure as it becomes excessive. In this manner the device regulates the heating system so that it does not require attention insofar as the water supply and pressure control is concerned.

This device eliminates the ordinary water supply tank with which domestic hot water systems are commonly equipped. This invention while primarily designed for hot water heating systems may be utilized in other capacities, and it is therefore not intended to restrict it in this respect.

Referring to the accompanying drawing, Figure 1 is a vertical end elevation of the device.

Figure 2 is a vertical sectional view of the device taken at right angles to Figure 1.

Figure 3 is a cross section taken on the line 3—3 of Figure 2.

Figure 4 is a cross section taken on the line 4—4 of Figure 2.

Like numerals of reference indicate corresponding parts in each of the figures throughout the drawing of the invention.

According to this invention, a valve body 5 is employed having an inlet 6 for connection to the cold water supply pipe of the usual city water system or the equivalent. The opposite end of the valve has an outlet 7 for connection to the piping leading to the furnace boiler, while intermediate of the said inlet and outlet is a throat 8 having a seat 9 the opening of which is controlled by a valve proper 10, hereinafter referred to as the "inlet valve". This valve controls the admission of cold feed water to the boiler.

Below the inlet valve is a valve seat 11 leading to a waste outlet 12 to which is attached a pipe 13 for conducting away water from the heating system to relieve pressure due to expansion. This valve seat has its opening controlled by a valve 14 hereinafter referred to as the "waste valve".

In the preferred construction of the invention herein illustrated the inlet valve 10 is supplied with a bellows 15 that functions as a stuffing box to prevent leakage about the stem 16. It is to be understood however that any other type of stuffing box may be used if so desired. The bellows 15 is of conventional character hence it need not be described in detail.

The stem 16 is tubular. Its lower end communicates with the outlet side of the valve body 5 while its upper end communicates with the interior of a bellows 17 to which it is rigidly connected. The connection is made to the bottom end plate 18 of the bellows. The bellows has an expansion element 19 of copper attached to the top plate 20 which is centrally depressed to provide a recess for a compression spring 21. The spring is seated in the recess to apply downward pressure on the plate; which plate is attached by the inner stem 21' to the waste valve 14.

The upper end of the spring is seated against a plug 22 regulated by a set-screw 23 threadedly engaged in the top member 24. This top member is stationary and forms a part of the head 25. Rods 26 attach the top member 24 to a bottom member 27 having a central hollow boss 28 threadedly engaged with a gland 29. The gland is connected by a nipple 30 to the valve body 5. The nipple is threaded over its entire length with the exception of an intermediate hexagonal section 31 receptive to a tool for turning it. A right-hand thread is used on both the nipple connections so that as the nipple is turned in one direction or the other it will feed out of one connection and into the other without disturbing the relative position of the head with respect to the valve body 5. A compression spring 32 is seated against the upper end of the nipple. This spring is also seated against the bottom plate 18 of the bellows 17 in order to apply pressure thereon to unseat the valve proper 10.

33 is a standard pressure gauge connected to the valve body 5. The rear surface 34 of the gauge is engaged by an angle plate 35 attached to the head to prevent its turning.

This device operates as follows: In the initial filling of the radiators of the heating system or replenishing the water therein the bellows 17 is positioned to hold the valve proper 10 unseated. The bellows is aided by the spring 32, the tension of which is adjusted by turning the nipple 30. Water from the source of supply flows from the inlet 6 through the throat 8 to the outlet 7. Water passes up through the hollow valve stem 16 to the bellows 17 and fills the same. As a predetermined pressure is reached the bellows expand forcing the bottom plate 18 downwardly, which carries the hollow stem 16 with it to seat the valve proper 10 against the seat 9 to shut off the water. The waste valve 14 remains closed by reason of the greater resistance of the spring 21.

Should the hot water in the system expand beyond a predetermined point it further expands the bellows 17 forcing the top plate upwardly against the tension of the spring 21. Since the inner stem 21' is attached to it the waste valve is unseated: this frees sufficient water to lower the pressure and in this manner the device automatically regulates the system.

What I claim is:—

1. A device of the class described comprising a valve body, a seat therein having an opening, a valve proper for controlling the seat opening, a bellows, a support therefor, and a hollow stem connecting the valve proper to the bellows, said stem communicating with the valve body and the bellows.

2. A device of the class described comprising a valve body, a seat therein having an opening, a valve proper for controlling the seat opening, a bellows, a support therefor, a hollow stem connecting the valve proper to the bellows, said stem communicating with the valve body and the bellows, and a spring applying pressure on the bellows to hold the valve proper in a normal position.

3. A device of the class described comprising a valve body, a seat therein having an opening, a valve proper for controlling the seat opening, a bellows, a support therefor, a hollow stem connecting the valve proper to the bellows, said stem communicating with the valve body and the bellows, a spring applying pressure on the bellows to hold the valve proper in a normal position, and means for adjusting the tension of the spring.

4. A device of the class described comprising the valve body, a pair of aligned seats therein having openings, a valve proper for controlling each seat opening, a tubular stem fixed to one of the two valves proper, a stem extending therethrough and fixed to the other valve proper, a bellows so supported as to enable it to expand under internal pressure, said tubular stem being affixed to one movable portion of the bellows and the other stem being affixed to an oppositely movable portion thereof, said hollow stem forming a communication between the valve body and the bellows, and a spring applying pressure on the bellows so as to resist the movement of the inner stem.

5. A device of the class described comprising a valve body, a pair of aligned seats therein having openings, a valve proper for controlling each seat opening, a tubular stem fixed to one of the two valves proper, a stem extending therethrough and fixed to the other valve proper, and a bellows mounted on said stems and having oppositely movable portions, one of which is affixed to each stem.

6. A device of the class described comprising a valve body, a pair of aligned seats therein having openings, a valve proper for controlling each seat opening, a tubular stem fixed to one of the two valves proper, a stem extending therethrough and fixed to the other valve proper, a bellows mounted on said stems and having oppositely movable portions, one of which is affixed to each stem, and means for causing one of the movable portions of the bellows to act under a greater pressure than the other.

7. A device of the class described comprising a valve body, a pair of aligned seats therein having openings, a valve proper for controlling each seat opening, a tubular stem fixed to one of the two valves proper, a stem extending therethrough and fixed to the other valve proper, a bellows mounted on said stems and having oppositely movable portions, one of which is affixed to each stem, and a spring for causing one of the movable portions of the bellows to act under a greater pressure than the other.

8. A device of the class described comprising a valve body, a pair of aligned seats therein having openings, a valve proper for controlling each seat opening, a tubular stem fixed to one of the two valves proper, a stem extending therethrough and fixed to the other valve proper, a bellows comprising a pair of oppositely movable plates, one of which is fixed to the tubular stem and the other to the inner stem, and a spring for resisting movement of one of the plates.

9. A device of the class described comprising a valve body, a pair of aligned seats therein having openings, a valve proper for controlling each seat opening, a tubular stem fixed to one of the two valves proper, a stem extending therethrough and fixed to the other valve proper, a bellows comprising a pair of oppositely movable plates, one of which is fixed to the tubular stem and the other to the inner stem, a stationary head, and a compression spring sustained by the head and seated against one of the plates.

10. A device of the class described comprising a valve body, a pair of aligned seats therein having openings, a valve proper for controlling each seat opening, a tubular stem fixed to one of the two valves proper, a stem extending therethrough and fixed to the other valve proper, a bellows comprising a pair of oppositely movable plates, one of which is fixed to the tubular stem and the other to the inner stem, a head comprising an upper member, a lower member, rods connecting said members, a nipple threadedly engaging said lower member and said valve body, means for turning said nipple, a coil spring seated against said nipple and one of the said plates of the bellows, and a spring seated against the other plate and adjustably supported by the upper member of the head.

WILLIAM JOHN CRAWFORD.